US008010481B2

(12) United States Patent
Sherwood et al.

(10) Patent No.: US 8,010,481 B2
(45) Date of Patent: Aug. 30, 2011

(54) PATTERN MATCHING TECHNIQUE FOR HIGH THROUGHPUT NETWORK PROCESSING

(75) Inventors: Timothy Peter Sherwood, Santa Barbara, CA (US); Lin Tan, Urbana, IL (US)

(73) Assignee: The Regents of the University of California, Oakland, CA (US)

( * ) Notice: Subject to any disclaimer, the term of this patent is extended or adjusted under 35 U.S.C. 154(b) by 639 days.

(21) Appl. No.: 11/715,186

(22) Filed: Mar. 7, 2007

(65) Prior Publication Data

US 2007/0233628 A1 Oct. 4, 2007

Related U.S. Application Data

(60) Provisional application No. 60/779,734, filed on Mar. 7, 2006.

(51) Int. Cl.
*G06F 15/00* (2006.01)
*G06F 15/18* (2006.01)

(52) U.S. Cl. ............... 706/62; 706/45; 706/16; 706/47; 706/48

(58) Field of Classification Search .............. 706/12, 706/14, 45–48, 62; 707/1, 6; 711/173
See application file for complete search history.

(56) References Cited

U.S. PATENT DOCUMENTS

| 5,548,775 | A  | * | 8/1996  | Hershey ............ 711/109 |
| 5,784,298 | A  | * | 7/1998  | Hershey et al. ........ 714/39 |
| 6,968,291 | B1 | * | 11/2005 | Desai .............. 702/182 |
| 7,301,792 | B2 | * | 11/2007 | Gould et al. .......... 365/49.15 |
| 7,356,663 | B2 | * | 4/2008  | Jain ................. 711/173 |
| 7,512,531 | B1 | * | 3/2009  | Shia ................. 703/16 |
| 7,539,681 | B2 | * | 5/2009  | Norton et al. ......... 707/9 |
| 7,890,692 | B2 | * | 2/2011  | Pandya .............. 711/103 |
| 2002/0099698 | A1 |   | 7/2002  | Abe et al. |
| 2003/0233600 | A1 | * | 12/2003 | Hartman et al. ........ 714/32 |
| 2004/0008701 | A1 | * | 1/2004  | Giacomini ............ 370/401 |
| 2005/0273450 | A1 | * | 12/2005 | McMillen et al. ....... 707/1 |
| 2006/0020595 | A1 | * | 1/2006  | Norton et al. ......... 707/6 |
| 2006/0106773 | A1 | * | 5/2006  | Chang et al. .......... 707/3 |
| 2007/0282835 | A1 | * | 12/2007 | Duxbury ............. 707/6 |
| 2008/0101371 | A1 | * | 5/2008  | Law et al. ........... 370/392 |
| 2008/0263039 | A1 | * | 10/2008 | Van Lunteren ......... 707/6 |

OTHER PUBLICATIONS

Tan et al., "A High Troughput String Matching Architecture for Intrusion Detection and Prevention", ISCA 2005, pp. 1-11.*
Nishimura et al., "Speed-up of Aho-Corasick Pattern Matching Machines by Rearranging States" IEEE, 2001, pp. 175-185.*
Tuck et al., "Deterministic Memory-Efficient String Matching Algorithms for Intrusion Detection", IEEE, 2004, pp. 2628-2639.*
Aldwairi et al., "Configurable String Matching Hardware for Speeding up Intrusion Detection", ACM SIGARCH Computer Architecture News, 2005, pp. 99-107.*

(Continued)

*Primary Examiner* — Omar F Fernandez Rivas
(74) *Attorney, Agent, or Firm* — Gates & Cooper LLP (57) ABSTRACT

A pattern matching technique for high throughput network processing includes a simple yet powerful special purpose architecture and a set of novel string matching algorithms that can work in unison. The novel set of algorithms allow for bit-level partitioning of rules such that may be more easily implemented in hardware or software. The result is a device that maintains tight worst case bounds on performance, can be updated with new rules without interrupting operation, compiles in seconds instead of hours, and is ten times more efficient than the existing best known solutions in this area.

21 Claims, 7 Drawing Sheets

OTHER PUBLICATIONS

Aldwairi et al., "Configurable String Matching Hardware for Speeding up Intrusion Detection", ACM 2005, pp. 99-107.*
Piyachon et al., "Efficient Memory Utilization on Network Processors for Deep Packet Inspection", ANCS 2006 pp. 71-80.*
Aho, A.V. et al., "Efficient string matching: An aid to bibliographic search," Communications of the ACM, 1975, 18(6), pp. 333-340.
Aldwairi, M. et al., "Configurable string matching hardware for speedup up intrusion detection," In Workshop on Architectural Support for Security and Anti-virus (WASSA), held in Cooperation with ASPLOS XI, Oct. 2004.
Baker, Z.K. et al., "A methodology for synthesis of efficient intrusion detection systems on FPGAs," In Proceedings of the Field-Programmable Custom Computing Machines, 2004, pp. 135-144.
Baker, Z.K. et al., "Time and area efficient pattern matching on FPGAs," In Proceeding of the 2004 ACM/SIGDA 12th International Symposium on Field Programmable Gate Arrays, 2004, pp. 223-232.
Boyer, R.S. et al., "A fast string searching algorithm," Communications of the ACM, 1977, 20(10):761-772.
Cho, Y. et al., "Deep packet filter with dedicated logic and read only memories," In IEEE Symposium on Field-Progammable Custom Computing Machines, Apr. 2004.
Cho, Y.H. et al., "Specialized hardware for deep network packet filtering," In 12th International Conference on Field-Programmable Logic and Applications, 2002.
Clark, C.R. et al., "Efficient reconfigurable logic circuits for matching complex network intrusion detection patterns," In Proceedings of the 13th International Conference on Field Programmable Logic and Applications, Sep. 2003.
Crosby, S.A. et al., "Denial of service via algorithmic complexity attacks," In Proceedings of USENIX Annual Technical Conference, Jun. 2003.
Dharmapurikar, S. et al., "Deep packet inspection using parallel bloom filters," Micro, IEEE, 2004, 24(1), pp. 52-61.
Fisk, M. et al., "Applying fast string matching to intrusion detection," Technical Report, in preparation, successor to UCSD TR CS2001-0670, University of California, San Diego.
Gokhale, M. et al., "Granidt: Towards gigabit rate network intrusion detection technology," In Proceedings of the 12th International Conference on Field-Progammable Logic and Applications, 2002, pp. 404-413.
Hutchings, B.L. et al., "Assisting network intrusion detection with reconfigurable hardware," In Proceedings of the 10th Annual IEEE Symposium on Field-Programmable Custom Computing Machines, 2002, pp. 1-10.
Mai, K. et al., "Smart memories: A modular reconfigurable architecture," In Annual International Symposium on Computer Architecture, Jun. 2000.
Roesch, M., "Snort—lightweight intrusion detection for networks," In Proceedings of LISA '99: 13th Systems Administration Conference, Nov. 1999, pp. 229-238.
Sourdis, I. et al., "Pre-decoded CAMs for efficient and high-speed NIDS pattern matching," In Proceedings of the Field-Programmable Custom Computing Machines, 2004, pp. 258-267.
Srinivasan, V. et al., "Fast address lookups using controlled prefix expansion," ACM Transactions on Computer Systems, Feb. 1999, 7(1):1-40.
Swanson, S. et al., "Wavescalar," In 36th International Symposium on Microarchitecture, Dec. 2003.
Taylor, M.B. et al., "Evaluation of the Raw microprocessor: An exposed-wire-delay architecture for ILP and streams," In Annual International Symposium on Computer Architecture, Jun. 2004.
Tuck, N. et al., "Deterministic memory-efficient string matching algorithms for intrusion detection," In the 23rd Conference of the IEEE Communications Society (Infocomm), Mar. 2004.

* cited by examiner

PATTERN MATCHING TECHNIQUE FOR HIGH THROUGHPUT NETWORK PROCESSING

CROSS-REFERENCE TO RELATED APPLICATION

This application claims the benefit under 35 U.S.C. Section 119(e) of the following co-pending and commonly-assigned U.S. patent application:

U.S. Provisional Patent Application Ser. No. 60/779,734, filed on Mar. 7, 2006, by Timothy Peter Sherwood and Lin Tan entitled "PATTERN MATCHING TECHNIQUE FOR HIGH THROUGHPUT NETWORK PROCESSING";

which application is incorporated by reference herein.

STATEMENT REGARDING FEDERALLY SPONSORED RESEARCH AND DEVELOPMENT

This invention was made with Government support under Grant No. CCF-0448654 awarded by the NSF. The Government has certain rights in this invention.

BACKGROUND OF THE INVENTION

1. Field of the Invention

The invention is related to a pattern matching technique for high throughput network processing.

2. Description of the Related Art (Note: This application references a number of different publications as indicated throughout the specification by one or more reference numbers within brackets, e.g., [x]. A list of these different publications and patents ordered according to these reference numbers can be found below in the section entitled "References." Each of these publications and patents is incorporated by reference herein.)

Pattern matching is one of the most fundamental operations that modern network devices (such as routers, access points, intrusion detection systems, etc.) need to perform at high speed. For example, Internet Protocol (IP)-forwarding requires longest-prefix matching, packet classification requires multidimensional range queries, and intrusion detection requires high speed string matching. The amount of network traffic seen by a router is already on the order of tens of gigabits per second, and keeping up with these speeds requires the development of specialized devices and algorithms.

The following paragraphs describes efforts made in related areas:

Software-based: Most software based techniques concentrate on reducing the common case performance. Boyer-Moore [5] is a prime example of such a technique, as it lets its user search for strings in sub-linear time if the suffix of the string to be searched for appears rarely in the input stream.

While Boyer-Moore only searches for one string at a time, Fisk and Varghese [11] present a multiple-pattern search algorithm, that combines the one-pass approach of Aho-Corasick with the skipping feature of Boyer-Moore, as optimized for the average case by Horspool. The work by Tuck, et al. [20] takes a different approach to optimizing Aho-Corasick, by instead looking at bitmap compression and path compression to reduce the amount of memory needed.

Field Programmable Gate Array (FPGA)-based: The area that has seen the most amount of string matching research is in the reconfigurable computing community [8,13,16,12,3,4,7,10,6,2]. Proponents of the work in this area argue intrusion detection is a perfect application of reconfigurable computing because it is computationally intensive, throughput oriented, and the rule sets change over time but only relatively slowly. Because FPGAs are inherently reconfigurable, the majority of prior work in this area focuses on efficient ways to map a given rule set down to a specialized circuit that implements the search. The configuration (the circuit implemented on the FPGA) is custom designed to take advantage of the nature of a given specific rule set, and any change to the rule set will require the generation of a new circuit (usually in a hardware description language) which is then compiled down through the use of Computer Aided Design (CAD) tools.

The work of Sourdis and Pnevmatikatos [16] describes an approach that is specifically tuned to the hardware resource available to devices, available from Xilinx, to provide near optimal resource utilization and performance. Because Sourdis and Pnevmatikatos [16] demonstrate that their mapping is highly efficient, and they compare against prior work in the domain of reconfigurable computing, the present invention compares directly against their approach. Even though every shift-register and logic unit is being used in a highly efficient manner, the density and regularity of SRAM are used to a significant advantage in our approach, resulting in silicon level efficiencies of 10 times greater or more. It should be also noted that most FPGA based approaches are usually truly tied to an FPGA based implementation, because they rely on the underlying reconfigurability to adjust to new rule sets. In our approach, this is provided simply by updating the SRAM, and can be done in a manner that does not require a temporary loss of service.

What is needed, then, is an improved method of pattern matching over high-throughput network traffic. The present invention satisfies this need. The utility of this invention is that it provides a way to maintain tight bounds on worst case performance, allows updates with new rules without interrupting operation, and enables an order of magnitude increase in efficiency over prior art. This is potentially of interest to any producer of high throughput network devices.

SUMMARY OF THE INVENTION

To overcome the limitations in the prior art described above, and to overcome other limitations that will become apparent upon reading and understanding the present specification, the present invention discloses a pattern matching technique for high throughput network processing. The present invention includes a simple yet powerful special purpose architecture and a set of novel string matching algorithms that can work in unison.

The key to achieving both high performance and high efficiency is to build an array of tiny finite state machines, each of which searches for a portion of the rules and a portion of the bits in each rule. The present invention includes a novel set of algorithms that allow for bit-level partitioning of rules such that may be more easily implemented in hardware or software.

Therefore, the present invention discloses a method for high throughput pattern matching, comprising executing an array of finite state machines to efficiently search a set of high throughput data for any number of matching rules, wherein each of the finite state machines searches for a subset of the rules, a subset of the bits in each rule, or a combination of such subsets. The rules may define search patterns, wherein the search patterns perform string matching. The finite state machines may be Aho-Corasick state machines, and operate in parallel.

Finite state machines may be built using bit-level partitioning of the rules. The building step may comprise translating a rule set into an array of bit-level finite state machines that serve the same purpose. Each bit level finite state machines may match only some of the bits of an input stream. A rule compiler may partition and bit-split a finite state machine representation of the rules into a set of smaller implementable state transition tables. The rules may be SNORT rules, partitioned into groups of 8 or 16 strings, and the bit splitting may be into four smaller implementable state transition tables. The bit-splitting may comprise bit splitting the finite state machines into a set of smaller implementable state transition tables which are represented by a plurality of binary state machines, prior to, or during the execution step.

The set of data may comprise one or more bytes of data and the executing and searching further comprises (1) distributing one, two or four bits of each byte to each of the binary state machines (2) matching the one, two, or four bits to the subset of the rules, the subset of the bits in each rule, or a combination of such subsets, in each binary state machine, (3) outputting a partial match vector from each binary state machine, and (4) generating a full match vector using the partial match vector.

Results of the finite state machines may be combined together to produce a final result. A match may be always indicated if it is exists, and never indicated if it does not exist, or a match may be always indicated if it exists, and sometimes indicated if it does not exist, in the case of false positives.

The method may further comprise executing an accelerator to perform a different search than the finite state machines. A replacement update model may allow non-interrupting rule update.

The pattern matching may be applied to network processing data, wherein the network processing comprises network intrusion detection, address lookup, or packet classification.

The result is a device that maintains tight worst case bounds on performance, can be updated with new rules without interrupting operation, compiles in seconds instead of hours, and is ten times more efficient than the existing best known solutions in this area. For example, the device may operate above or at 10 Gigabits per second using a Snort rule set stored in 0.4 MegaBytes of space, or with increased throughput and minimized storage requirements.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to a specific embodiment in which the invention may be practiced. It is to be understood that other embodiments may be utilized and structural changes may be made without departing from the scope of the present invention.

Overview

The present invention converts a large database of rules (also referred to as "search patterns" or "strings") into many tiny finite state machines, each of which searches for a portion of the rules and a portion of the bits of each rule. The present invention includes algorithms to translate a rule set into an array of bit-level state machines which serve the same purpose. Each of these bit-level machines then operates in parallel, and the present invention also comprises an approach that relies on either a special purpose or reconfigurable architecture to provide simultaneous operation. This approach can lead to designs which are 10 times more efficient than best known techniques in terms of throughput per area.

Specifically, this invention is novel in the following ways:
  It describes a novel configurable String Matching Architecture that can store the entire Snort rule set in only 0.4 MB, and can operate at upwards of 10 Gbit/sec per instance.
  It describes a novel String Matching Algorithm, that operates through the conjunction of many small state machines working in unison, and that reduces the number of required out-edges from 256 to as low as 2.
  The machine is configured by a Rule Compiler that partitions and bit-splits a finite state machine (FSM) representation of the strings into a set of small implementable state transition tables. The compiler takes only on the order of seconds to complete.
  A novel method of replacement update model that allows non-interrupting rule update which can complete in the order of seconds, while FPGA based methods generally require days or months to recompile rules.

TECHNICAL DESCRIPTION

In order to meet the goals described above, the present invention takes an approach that relies on a simple yet powerful special purpose architecture, working in conjunction with novel string matching algorithms specially optimized for that architecture. The key to achieving both high performance and high efficiency is to build many tiny state machines, each of which searches for a portion of the rules and a portion of the bits of each rule. The new algorithms of the present invention are specifically tailored towards implementation in an architecture built up as an array of small memory tiles, and the present invention develops both the software and the architecture in concert with one another. The result of the present invention is a device that maintains tight worst case bounds on performance, can be updated with new rules without interrupting operation, has configurations generated in seconds instead of hours, and is ten times more efficient that the existing best known solutions.

At a high level, the present invention's algorithm works by breaking the set of strings down into a set of small state machines. Each state machine is in charge of recognizing a subset of the strings from the rule set. There are two major concerns with this approach.

The first concern is that building a state machine from any general regular expression can in the worst case require an exponential number of states. The present invention gets around this problem by exploiting the fact that the present invention does not require matching general regular expression(s), but rather a proper and well defined subset of them for which the present invention can apply the Aho-Corasick algorithm [1].

The other problem is that lack of care in the design would require supporting 256 possible out edges (one for each possible byte) on each and every node on the state machine. This results in a huge data structure that can neither be stored nor traversed efficiently. The present invention solves this problem by bit-splitting the state machines into many smaller state machines, which each match only 1-bit (or a small number of bits) of the input at a time (in parallel).

The present invention's architecture is built hierarchically around the way that the sets of strings are broken down. At the highest level is the full device. Each device holds the entire set of strings that are to be searched, and each cycle the device reads in a character from an incoming packet, and computes the set of matches. Matches can be reported either after every byte, or can be accumulated and reported on a per-packet basis. Devices can be replicated, with one packet sent to each device in a load balanced manner, to multiply the throughput.

Figure 1:
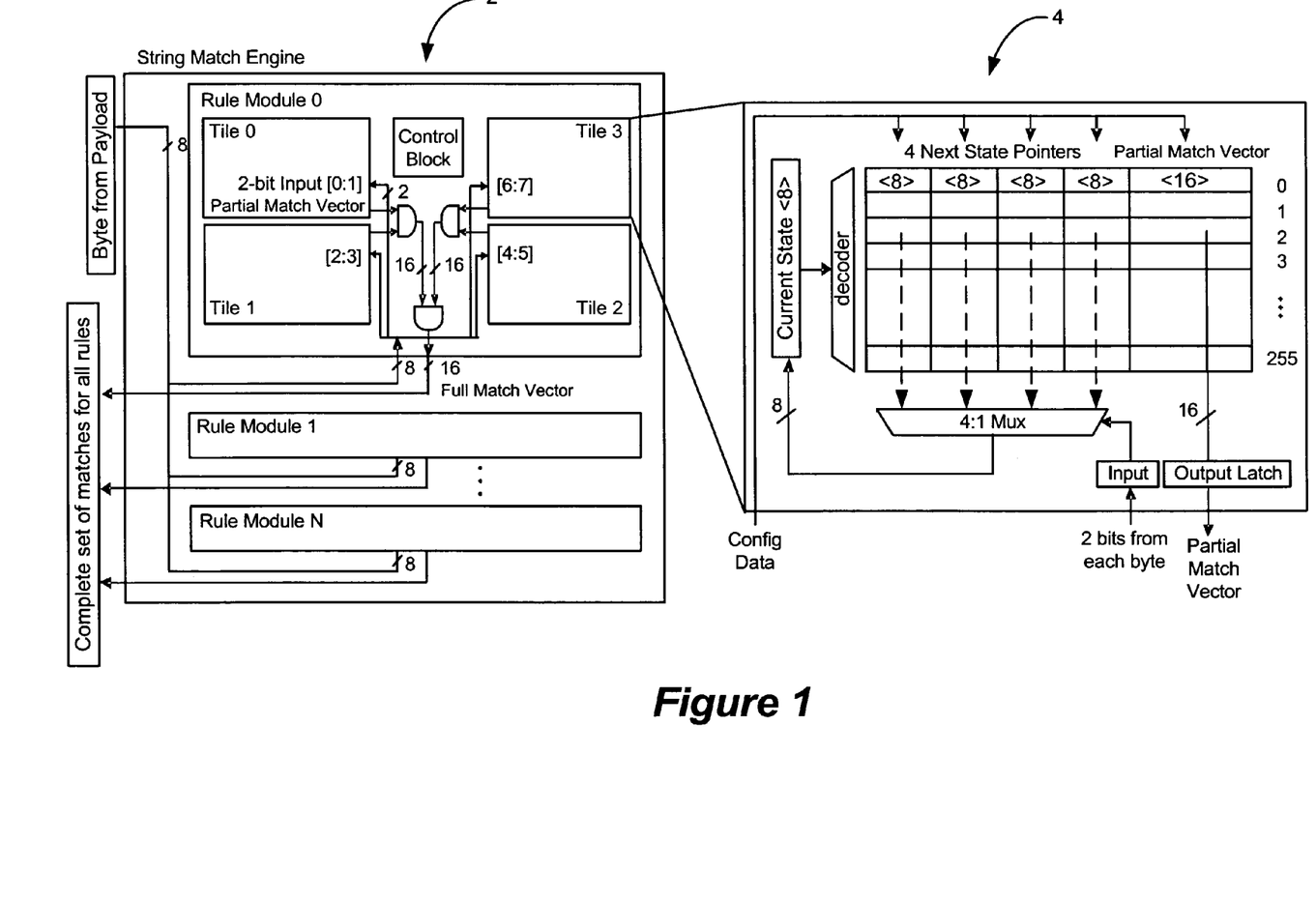
FIG. 1 is a schematic of a String Matching Engine of the High Throughput Architecture.

FIG. 1 is a schematic of a string matching engine of the high throughput architecture. The left side (2) of FIG. 1 is a full device, comprised of a set of rule modules. Each rule module acts as a large state machine, which reads in bytes and outputs string match results, and is responsible for a group of rules, g rules.

Each rule module comprises a set of tiles (4 tiles are shown in FIG. 1). The right side (or inset) of FIG. 1 shows the structure of a tile. Each tile is essentially a table with some number of entries (256 entries are shown in FIG. 1) and each row in the table is a state. Each state has some number of next state pointers (4 possible next states are shown) and a partial match vector of length g. A rule module takes one character (8 bits) as input at each cycle, and outputs the logical AND operation result of the partial match vectors of each tile.

Unlike in an FPGA based scheme [16,12,3,4,7,10,6,2], where specialized circuits are compiled from a set of rules, the present invention's approach can take advantage of the incredible density of SRAM to implement the search. The rule modules are all structurally equivalent, being configured only through the loading of their tables, and each module holds a subset of the rule database. As a packet flows through the system, each byte of the packet is broadcast to all of the rule modules, and each module checks the stream for an occurrence of a rule in its rule set. Because throughput, not latency, is the primary concern of our design the broadcast has limited overhead because it can be deeply pipelined if necessary.

The full set of rules is partitioned between the rule modules. The way this partitioning is done has an impact on the total number of states required in the machine, and will therefore have an impact on the total amount of space required for an efficient implementation. When a match is found in one or more of the rule modules, that match is reported to the interface of the device so that the intrusion detection system can take the appropriate actions. It is what happens inside each rule module that gives the present invention's approach both high efficiency and throughput.

The right hand side (4) of FIG. 1 shows the structure of each and every tile in the present invention's design. Tiles, when working together, are responsible for the actual implementation of a state machine that really recognizes a string in the input. If the present invention merely generated a state machine in a naive manner, each state may transition to one of potentially 256 possible next states at any time. If the present invention were to actually keep a pointer for each of these 256 possibilities, each node would be on the order a kilobyte. A string of length l requires l states, which, when multiplied by the total number of rules, leads to far more data than is feasible to store on-chip. As a result, the trade-off is either store the state off-chip and lose your bounds on worst case performance, or find a way to compress the data is some way. Past techniques have relied on run length encoding and/or bit-mapping which have been adapted from similar techniques used to speed IP-lookup [20].

The present invention's approach is different in that the state machines are split apart into a set of new state machines, each of which matches only some of the bits of the input stream. In essence each new state machine acts as a filter, which is only passed when a given input stream could be a match. Only when all of the filters agree is a match declared.

Each tile is essentially a table with some number of entries (256 entries are shown in FIG. 1), and each row in the table is a state. Each state has two parts. It has some number of next state pointers, which encode the state transitions (4 possible next states are shown and each is indexed by a different 2 bits from the byte stream), and it has a partial match vector. The partial match vector is a bit-vector that indicates the potential for a match for every rule that the module is responsible for. If there are up to g rules mapped to a rule module, then each state of each tile will have a partial match vector of length g bits (FIG. 1 shows a module with g=16). By taking the AND of each of the partial match vectors, the present invention can find a full match vector, which indicates that all of the partial match vectors are in agreement and that a true match for a particular rule has been found.

Before accepting any input characters, and at the beginning of each packet, all tiles are reset to start from state 0. On each cycle, the input byte is divided into groups of bits (in the example, the 8-bits are divided into 4 groups of 2). Each tile then gets its own group of bits. Each tile uses its own internal state to index a line in the memory tile, and the partial match vector is read out along with the set of possible state transitions. The input bits are used to select the next state for updating, and the partial match vector is sent to an AND unit where it is combined with the others. Finally all full match vectors for all modules are concatenated to indicate which of the strings were matched.

So far, the architectural issues in implementing a high speed string matching engine have been discussed. In the next section, the software system (also referred to as the rule compiler) which makes the architecture work is described.

Readers may already be familiar with efficient algorithms for string matching, such as Boyer-Moore [5], which are designed to find a single string in a long input. The present invention addresses a slightly different problem, namely, searching for one of a set of strings from the input stream. While simply performing multiple passes of a standard one-string matching algorithm will be functionally correct, it does not scale to handle the thousands of strings that are required by modern intrusion detection systems.

Instead, the set of strings the present invention is looking for can be folded together into a single large state-machine. This method, the Aho-Corasick algorithm [1], is what is used in the fgrep utility as well as in some of the latest versions of the Snort [15] network intrusion detection system.

The Aho-Corasick Algorithm

The essence of the Aho-Corasick algorithm involves a pre-processing step, which builds up a state machine that encodes all of the strings to be searched. The state machine is generated in two stages.

The first stage builds up a tree of all the strings that need to be identified in the input stream. The root of the tree represents the state where no strings have been even partially matched. The tree has a branching factor equal to the number of symbols in the language. For the Snort rules, this is a factor of 256 because Snort can specify any valid byte as part of a string. All the strings are enumerated from this root node, and any strings that share a common prefix will share a set of parents in the tree.

Figure 2:
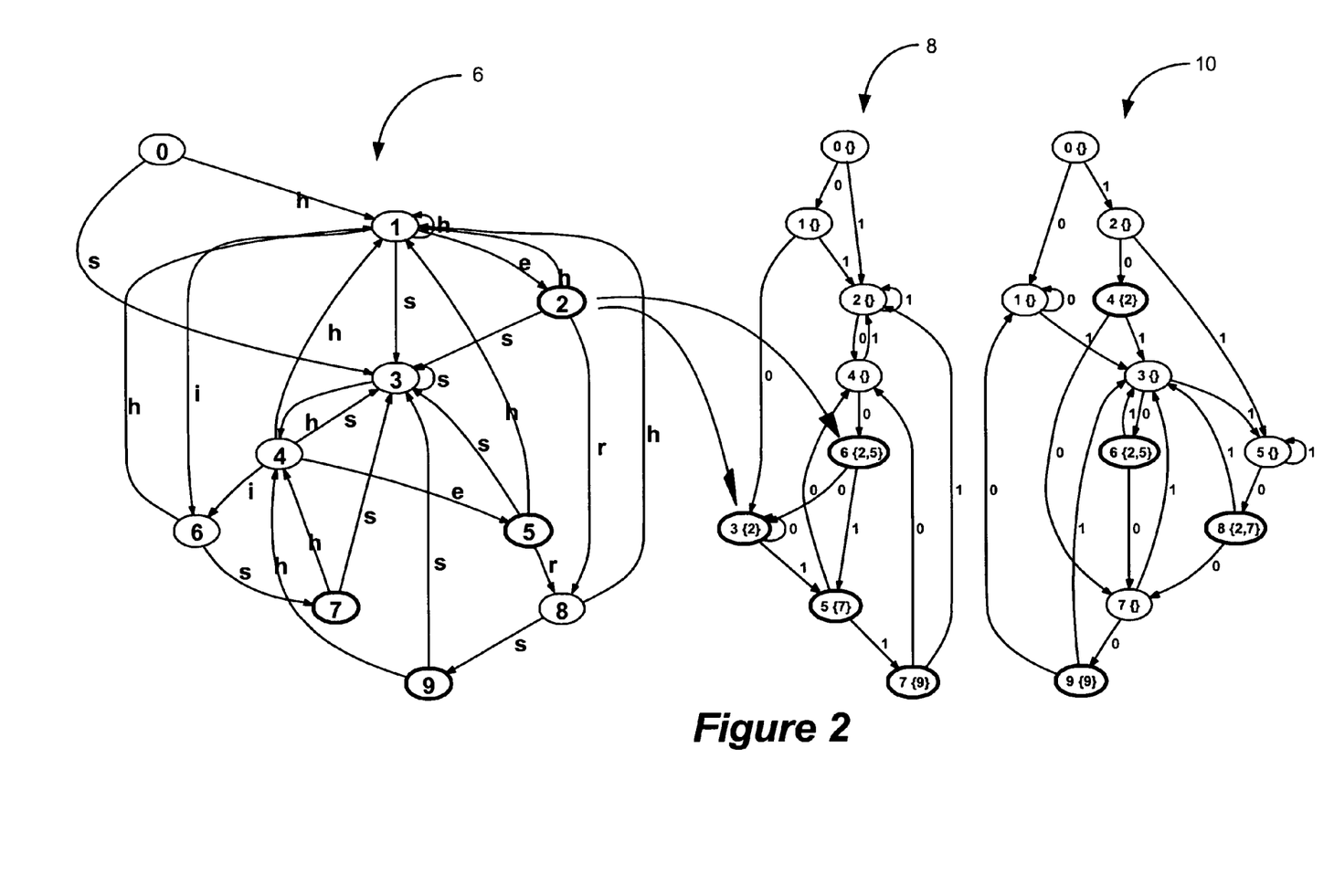
FIG. 2 is a state machine diagram illustrating the technique of extracting bit-level parallelism from the Aho-Corasick algorithm, by splitting the state machine into 8 parallel state machines.

FIG. 2 is a state machine diagram illustrating the technique of extracting bit-level parallelism from the Aho-Corasick algorithm, by splitting the state machine into 8 parallel state machines. The left-most state machine (6) is an example Aho-Corasick state machine (D) constructed for strings "he", "she", "his" and "hers". Next state pointers pointing back to State 0 are not shown in the graph, because it is unrealistic and also unclear to show all of the 256 next state pointers for each state in this limited space. The other two state machines are two binary state machines $B_3$ (8) and $B_4$ (10) among the eight state machines $B_0, B_1 \ldots,$ and $B_7$, split from D. State machine $B_3$ is only responsible for Bit 3 of any input character, while state machine $B_4$ is only responsible for Bit 4 of any input character.

To match a string, start at the root node and traverse edges according to the input characters observed. The second half of the preprocessing is inserting failure edges. When a string match is not found it is possible for the suffix of one string to match the prefix of another. To handle this case, failure edges are inserted which shortcut from a partial match of one string to a partial match of another. FIG. 2 shows the full state machine with failure edges (however failure edges that point back to the root node are not shown for clarity).

As an example, suppose that the input stream is "hxhe", which would match the string "he". Traversal starts at state 0, and then proceeds to state 1 (after reading "h"), 0 (after reading "x"), back to 1 (after reading "h"), and finally ending at state 2. State 2 is an accepting state and matches the string "he". In the Aho-Corasick algorithm there is a one-to-one correspondence between accepting states and strings, where each accepting state indicates the match to a unique string.

Implementation Issues

The Aho-Corasick algorithm has many positive properties, and perhaps the most important is that after the strings have been pre-processed, the algorithm always runs in time linear to the length of the input stream, regardless of the number of strings. The problems with the algorithm lie in realizing a practical implementation, and the problems are two-fold.

Both problems stem from the large number of possible out edges that are directed out of each and every node. Implementing those out edges requires a great deal of next pointers, 256 for each and every node to be exact. In the simple example presented above, there are only 4 possible characters so it is easier, but in reality encoding these potential state transitions requires a good deal of space. Encoding the state transitions as 32-bit pointers would balloon the size of the rule database to 12.5 megabytes, far larger than could economically fit on a chip.

This leads to the second problem, which is the serial nature of the state machine. The determination of which state to go to next is strictly dependent on the current state. The determination of the next state from the current state forms a critical loop, and because that next state could be one of 256 different memory locations throughout a large data structure, it is very difficult to make this determination quickly. While Tuck et al. [20] show how these structures could be compressed, they still take on the order of megabytes, and the compression greatly complicates the computation that needs to be performed.

To examine the behavior of string matching on real data, the present invention generated the Aho-Corasick state machine for a set of strings used for actual intrusion detection and packet filtering. For this, the present invention used the default string set supplied with Snort, which includes, as part of its rule base, a set of over 1000 suspicious strings resulting in an Aho-Corasick state machine with around 10,000 nodes.

Splitting Apart the State Machines

While Aho-Corasick state machines can be searched in constant time per character, a real implementation requires large amounts of storage and requires a dependent memory reference for each character searched. Storing each state as an array of 256 next pointers is wasteful. Furthermore, there is a high variation in the number of next pointers that any given state needs. Nodes near the root of the tree need more than 200 next pointers, while nodes near the leaves need only 1 or 2. A way of breaking this problem into a set of smaller problems, each of which has more regular behavior, is required.

To solve this problem, the present invention splits the state machines apart into a plurality of state machines. Each state machine is then responsible for only a subset of the bits composing the original input character.

Three advantages of this technique are:

The split machines have a reduced number of possible next states (not a large and variable number as in the original design). This is far easier to compact into a small amount of memory.

The state machines are loosely coupled, and they can be run independently of one another, and the present invention can merge the results back together.

Each state machine is essentially a n-ary (for example, binary) tree with back edges. This means the present invention can speed the tree up by traversing multiple edges at a time (as in a multi-bit trie [17]).

For the purposes of explanation, consider an 8-bit state machine bit-split into 8 one-bit state machines. From the state machine D constructed in Aho-Corasick Algorithm, each bit of the 8-bit ASCII code is extracted to construct its own Binary State Machine, a state machine whose alphabet contains only 0 and 1. Let $B_0, B_1 \ldots, B_7$ be these state machines (1 per bit).

For each bit position i the present invention takes the following steps to build the binary state machine $B_i$. Starting from the start state of D, the present invention looks at all of the possible next states. The present invention partitions the next states of D into two sets, those that come from a transition with bit i set to 1, and those which transition with bit i set to 0. These sets become two new states in $B_i$. This process is repeated until the present invention fills out all of the next states in the binary state machine, in a process analogous to subset construction (although the binary state machines of the present invention can never have more states than D). Each state in $B_i$ maps to one or more states in D.

After the construction, the mapping to non-output states of D are not needed any more and so can be eliminated from the resulting state machines. On the other hand, the mapping to output states of D still needs to be stored for all states. Each output state in D (which indicates the matching of a rule) corresponds to one or more states in $B_i$. A resulting state in $B_i$ is an accepting state if it maps back to any of the accepting states of D. A small bit-vector is kept for each state in binary state machines, indicating which of the strings might be matched at that point. Only if all of the bit-vectors agree on the match of at least one string has a match actually occurred.

FIG. 2 shows two of the binary state machines generated from the state machine on the left. The state machine in the middle (8) FIG. 2 is state machine $B_3$, which is only responsible for bit 3 of the input, and the state machine on the right (10) of FIG. 2 is state machine $B_4$. As can be seen, state 2 in the original state machine maps to state 3 and 6 in $B_3$, and state 4, 6, and 8 in $B_4$.

Now it may be seen how a binary state machine is constructed from an Aho-Corasick state machine, by constructing $B_3$ in this concrete example. Starting from State 0 in D, which the present invention calls D-State 0, the present invention constructs a State 0 for $B_3$, which is called $B_3$-State 0, with a state set {0}. Numbers in a state set are D-State numbers. The present invention examines all states kept in the state set of $B_3$-State 0, which is D-State 0 in this example, and sees what D-States can be reached from them reading in input value "0" and "1" in bit 3 respectively. For example, D-State 0 and D-State 1 are reachable from D-State 0 reading in input value "0". A new state, $B_3$-State 1, with state set {0,1} is then created. Similarly, $B_3$-State 2 with state set {0,3} is created as the next state for $B_3$-State 0 for input value "1". Then $B_3$-State 3 with state set {0,1,2} is created as the next state for $B_3$-State 1 for input value "0". The next state for $B_3$-State 1, for input value "1," is an existing state $B_3$-State 2, so there is no need to create a new state. $B_3$ is constructed by following this process until next states of all states are constructed. After the construction, non-output states kept in state sets, such as 0, 1 and 3, are eliminated, resulting in $B_3$ shown in the middle of FIG. 2.

The pseudo-code of the construction algorithm is as follows.

```
Algorithm 1. Construction of a binary state machine
from an Aho-Corasick state machine.
    Input. An Aho-Corasick state machine base
(represented by "base" in the code) and
the bit position for which a binary state machine
will be constructed (represented by "pos"
in the code ). Bits in a character are numbered
0, 1, 2, 3, 4, 5, 6, 7 from left to right.
Base.move[ ][ ] is the transition function and
base.output is the output function [1].
    Output. A binary state machine with move[ ][ ]
as the transition function, with
state_sets providing the mapping of output states,
and nState as the total number of states,
that accepts one bit at position pos.
    Method.
    {
        state = 0;
        queue = {state};
        state_sets[state] = {0};
        while (queue is not empty) {
        se[0] = empty; /* se[0]: a set used to record all possible
        D-states if the input bit is '0' */
        se[1] = empty; /* se[1]: a set used to record all possible
        D-states if the input bit is '1' */
        let r be the next state in queue;
        queue = queue − {r};
        isOutputState[0] = false; /* false: 0 state is not an
          output state */
        isOutputState[1] = false; /* false: 1 state is not an
          output state */
        for (each state st in state_sets[r]) {
        for ( i = 0; i<256; i++) {
        s = base.move[st][i];
        a = (unsigned)( i << pos ) >> (8−1) & 0x00000001;
        /* get the corresponding bit */
        add s to se[a];
        if (base.output[s] is not empty )
        isOutputState[a] = true;
        }
        }
        for (i =0; i<2; i++) {
        if ( se[i] is not empty ) {
        existing = false;
        for (j= 0; j<=state; j++)
        if ( se[i] == state_sets[j] ) { /* the
        new state set is generated before */
        position = j;
        existing = true;
        break;
        }
        if (!existing) { /* a real new state */
        state++;
        queue = queue + {state};
        move[r][i] = state;
        state_sets[state] = se[i];
        F[state] = isOutputState[i];
        /* F[ ]: record final states */
        }
        else { /* an existing new state */
        move[r][i] = position;
        }
        }
        }
        }/* end of for */
    }
    nState = state + 1; /* nState: total number of states in
    this Binary DFA */
    /* only store old output states in state_sets[ ] to save
    space, non-output states are eliminated in the following
    process */
    for (i = 0; i<nState; i++ ) {
        settemp = empty;
        for (each state st in state_sets[i] ) {
        if ( base.output[st] is not empty )
        settemp = settemp + {st};
        }
        state_sets[i] = settemp;
        }
} /* end of algorithm */
```

Finding a Match

This section examines the search processes in both the original Aho-Corasick state machine, and in the corresponding binary state machines for the example input stream "hxhe" used before. Reading in "hxhe", D will be traversed in the order of State 0, State 1, State 0, State 1 and State 2. The last state traversed, namely State 2, indicates the match of string "he".

Because, in this example, each state machine takes only one bit at a time, the present invention will need the binary encoding of the "hxhe" input shown in Table 1. Binary state machine $B_3$ will see only the 3rd bit of the input sequence, which is 0100. Looking to binary state machine $B_3$, the state traversal for this input will be State 0, State 1, State 2, State 4 and State 6. State 6 maps to states {2,5} in D. Similarly, the binary state machine $B_4$ will see the input 1110, and will be traversed in the order of State 0, State 2, State 5, State 5 and State 8, whose state set is {2,7}. The actual output state is the intersection of state sets of all 8 binary state machines. In this example, the intersection is D State 2, which is the same as the result of the Aho-Corasick state machine D. In the architecture described, this intersection step is completed by taking the logical AND of bit vectors in the on chip interconnect.

TABLE 1

| Binary Encoding of input stream "hxhe' | | | | | | | |
|---|---|---|---|---|---|---|---|
| Character | 1 | 2 | 3 | 4 | 5 | 6 | 7 |
| h | 0 | 1 | 0 | 1 | 0 | 0 | 0 |
| x | 0 | 1 | 1 | 1 | 0 | 0 | 0 |
| h | 0 | 1 | 0 | 1 | 0 | 0 | 0 |
| e | 0 | 1 | 0 | 0 | 1 | 0 | 1 |

The intersection of state sets can be empty, which means there is no actual output but there is partial output for some binary state machines. In the case of the input "xehs", for example, the ASCII encoding of bit 3 and bit 4 of "xehs" is 1001 and 1010 respectively. For state machine B$_3$, the state machine in the middle of FIG. 2, the traversal of states is State 0, State 2, State 4, State 6 and State 5, whose state set is {7}. For state machine B$_4$, the right-most state machine in FIG. 2, the resulting state set is {2,5} of State 6. The intersection of these two sets are empty, hence no string is matched.

The search algorithm is as follows.

```
Algorithm 2. Search for strings in binary state machines.
Input. A text string x and 8 binary state machines from b[0] to b[7].
Output. All matches of strings in x.
Method.
{
    for (i = 0; i<8; i++)
        state[i] = 0; // every binary state machine starts from state 0
    for ( each character in x ) {
        let k be the next character in x;
        mayoutput = true;
        for (i = 0; i < 8; i++) {
            bit = ( (unsigned)( k << i ) >> 8 – 1 ) & 0x00000001 ;
            if (! b[i].search_onechar(bit,state) )
                mayoutput = false;
        }
        if (mayoutput) {
            se = set intersection of b[i].state_sets[state[i]] for all i;
            if (se is not empty) {
                print index; /*index is the location in x
                    where matches are found*/
                print output function of all states in se;
            }
        }
    } /* end of for*/
} /* end of algorithm */
bool search_onechar(int key, int *state){
// return true: output state, false: not output state
    state[pos] = move[state[pos]][key];
    if (F[state[pos]])
        return true;
    else
        return false;
}
```

Partitioning the Rules

If all of the more than 1,000 strings are put into a big state machine, and the corresponding bit-split state machines are constructed, a partial match vector of more than 1,000 bits, most of which are zeros, will be needed for each tile entry. This is a big waste of storage. The present invention's solution to this problem is to divide the strings into small groups so that each group contains only a few strings, e.g. 16 strings, so that each partial match vector is only 16 bits. In this way each tile will be much smaller and thus can be accessed quicker.

Many different grouping techniques can be used for this purpose and can result in various storage in bits. In order to find the best dividing methods, the following constraints should be considered. The number of bits in a partial match vector determines the maximum number of strings each tile can handle. In addition, each tile can only store a fixed number of states, i.e. 256 states. An embodiment could make full use of the storage of both partial match vectors and state entries, which means the present invention packs as many strings in without going over 16 strings or 256 states. Larger sets of strings and larger state machines can be accommodated by dividing the rules into appropriately sized partitions and applying the algorithm independently to each partition. By analyzing the distribution of strings in a Snort rule set, the present invention finds that generally 16 strings require approximately 256 states.

A good solution is therefore to sort all strings lexicographically, and then divide them sequentially into groups, so that all the common prefixes can share states in state machines and thus use fewer states in total. While this is not the optimal solution, it is superior to the two alternatives, dividing by length and dividing randomly. The dividing by length method would consume 21.9% more states and 13.6% more groups than the method of the present invention used here, and the random grouping technique would use 12.1% more states and 4.5% more groups.

Filling the Tables

The discussion above has shown how to break a rule set into a set of groups, the way to construct Aho-Corasick state machines for each group, and the algorithm to split these Aho-Corasick state machines into new sets of state machines. The final step to mapping a rule set onto our architecture is then filling the tables in all modules. Each entry in a table is for one state. The next state pointers and the partial match vector for state x is stored in entry x.

Figure 3:
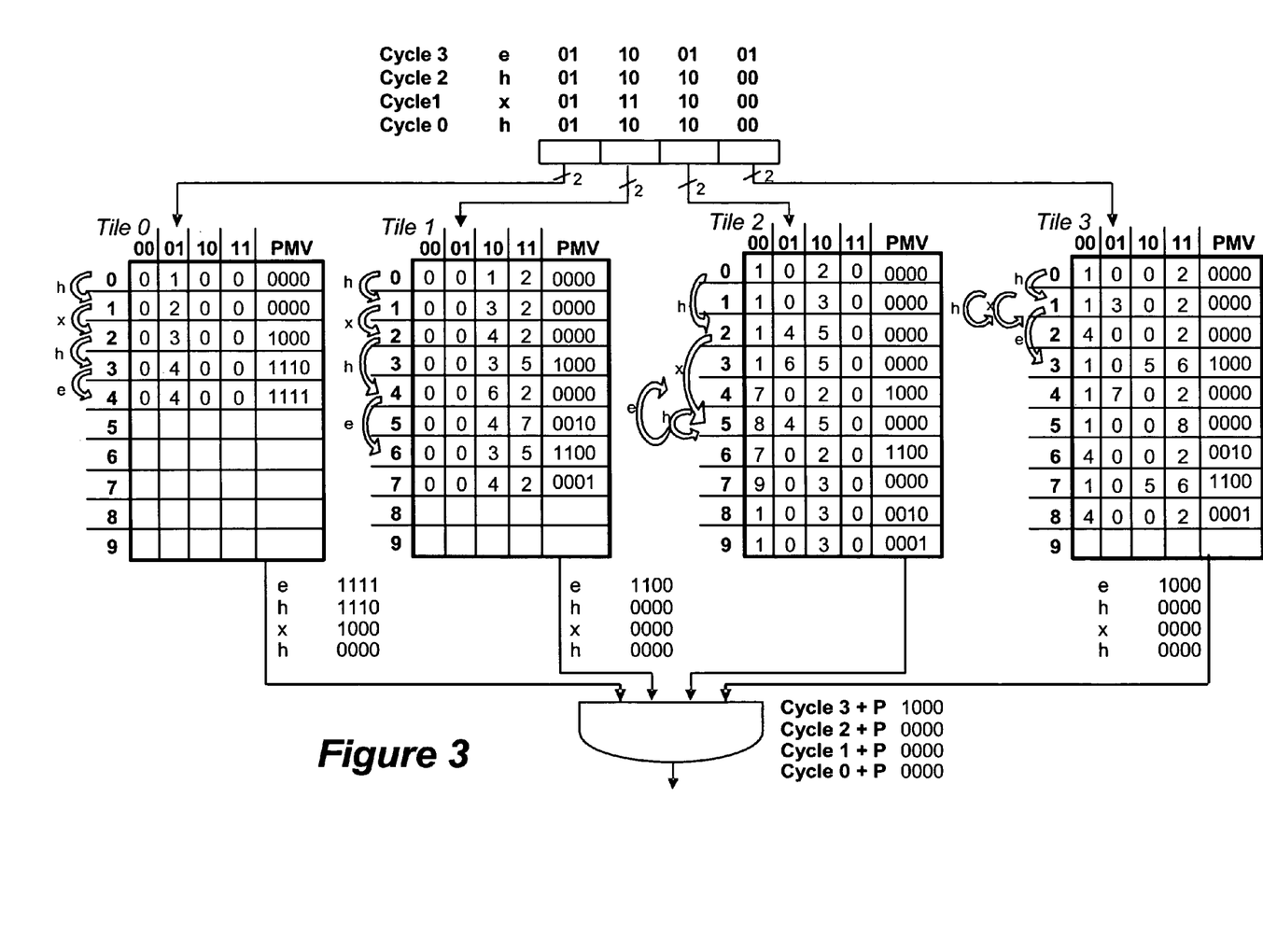
FIG. 3 shows an example of 4 state machines, split from the Aho-Corasick state machine in FIG. 2, mapped onto the new architecture.

FIG. 3 shows an example of 4 state machines, split from the Aho-Corasick state machine in FIG. 2, and mapped onto our architecture. Specifically, FIG. 3 shows the state transitions of input stream "hxhe" on the rule module for strings "he", "she", "his" and "hers". Only the first 4 bits of 16-bit Partial Match Vectors (PMV) are shown in this diagram because the rest of the 12 bits are all zeros for only 4 strings mapped onto the rule module.

Here, instead of splitting into 8 state machines, the present invention splits the Aho-Corasick state machine into 4 state machines, each of which is responsible for 2 bits of an input byte, and which is optimal in terms of storage. Still taking "hxhe" as an example input stream, the transitions of all of the 4 state machines starting from state 0 are shown by arrows. At each cycle, a partial match vector is produced by each tile, and the logic AND of these partial match vectors is outputted. According to different requirements of Intrusion Detection/Prevention Systems, the present invention's architecture can output only after an entire packet is scanned instead of at each cycle. The Full Match Vector output on Cycle 3+P, 1000, shows that by this cycle, string "he" is matched.

Figure 4:
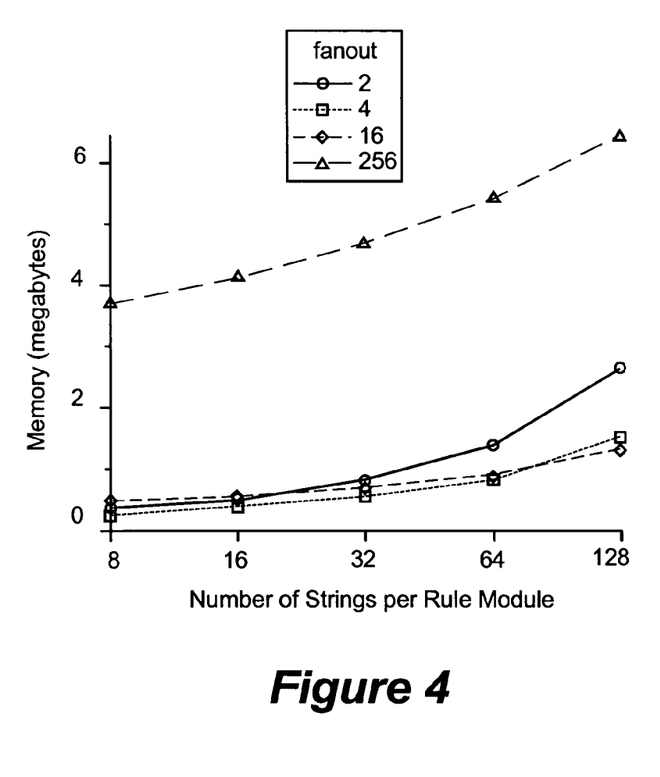
FIG. 4 is a graph plotting storage requirements for a rule set as a function of group size.

FIG. 4 is a practical memory comparison for different fanout and group sizes. Fanout is defined to be the maximal number of out edges from any state in the bit-split state machine. The X-axis is the number of strings per rule module or finite state machine (also known as group size), on a logarithmic scale. The Y axis is the memory, in Megabytes (Mbytes), required to store an entire SNORT rule set, as a function of group size and fanout of the state machines.

Figure 5:
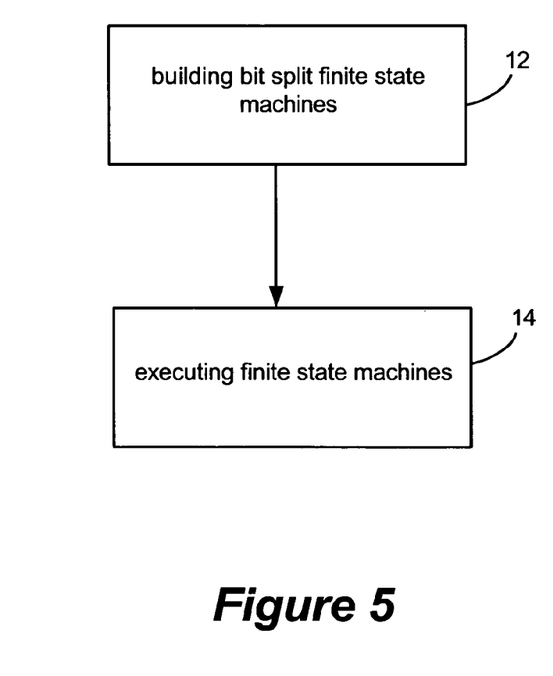
FIG. 5 is a flowchart illustrating the method of the present invention.

FIG. 5 illustrates the general method of the present invention.

Block 12 represents the step of building finite state machines, for example using bit-level partitioning of the rules. This may comprise translating a rule set, represented by the finite state machines, into an array of bit-level finite state machines that serve the same purpose, for example, partitioning and/or bit-splitting (using a rule compiler, for example)

the finite state machine representation of the rules into a set of smaller implementable state transition tables represented, for example, by a plurality of binary state machines. The rules may be SNORT rules, which are partitioned into groups of 8 or 16 strings, and the bit splitting may be into four smaller implementable state transition tables. The finite state machines may be Aho-Corasick state machines. Each bit level finite state machine may match only some of the bits of an input stream, and may operate in parallel.

Block 14 represents the step of executing an array of finite state machines to efficiently search a set of data for any number of rules, wherein each of the finite state machines searches for a subset of the rules, a subset of bits in each rule, or a combination of such subsets. The rules may define search patterns and the search patterns may perform string matching.

Figure 6:
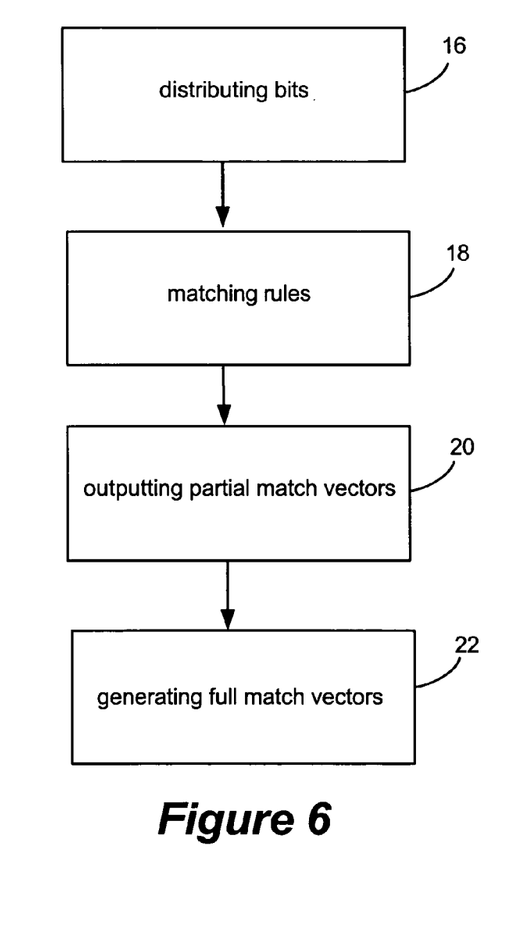
FIG. 6 is a flowchart illustrating an embodiment of the present invention.

FIG. 6 illustrates further steps of the executing and searching step of Block 12, wherein the set of data comprises one or more bytes.

Block 16 represents the step of distributing one, two or four bits of the byte to each of the binary state machines, per cycle.

Block 18 represents the step of matching the one, two, or four bits to the subset of the rules, the subset of the bits in each rule, or a combination of such subsets, in each binary state machine.

Block 20 represents the step of outputting a partial match vector from each binary state machine.

Block 22 represents the step of generating a full match vector using the partial match vector.

The results of the finite state machines executed in block 14 may be combined together to produce a final result. A match may be always indicated if it is exists, and never indicated if it does not exist. A match may be always indicated if it exists, and sometimes if it does not exist, in the case of false positives.

The method may further comprise executing an accelerator in block 14 to perform a different search than the finite state machines. The pattern matching is applied to network processing data, and the network processing may comprise network intrusion detection, address lookup, or packet classification.

Using the foregoing, a device implementing the method of the present invention may be constructed. The device may be implemented as an application-specific integrated circuit, or alternatively, the device may be implemented as a programmable processor or controller. Specifically, various embodiments of the logic of the present invention may be implemented in hardware and/or software.

Figure 7:
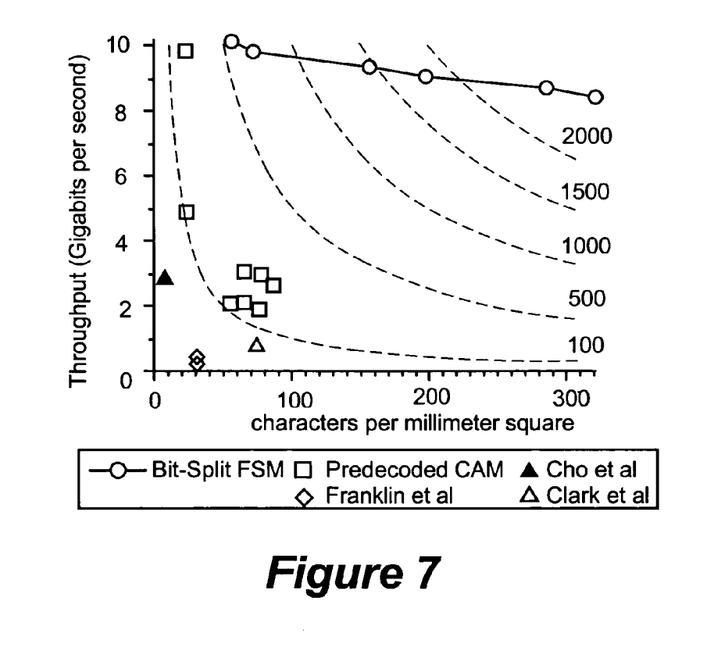
FIG. 7 is a graph plotting throughput as a function of area efficiency for the present invention, and compared to conventional technologies.

FIG. 7 shows how the device could operate above or at 10 Gigabits per second using a Snort rule set stored, for example, in 0.4 Megabytes of space. FIG. 7 plots throughput, in Gigabits per second (Gbps), as a function of area efficiency, which is the number of characters per square millimeter the design can support. The bit split finite state machine (FSM) design of the present invention is superior to the best FGPA designs, as represented by Cho et al [7], for example, in FIG. 7. Thus, FIG. 7 illustrates how the device would have increased throughput and minimized storage requirements.

Best Practice

To define suspicious activities, most modern network intrusion detection/prevention systems rely on a set of rules which are applied to matching packets. At a minimum, a rule consists of a type of packet to search, a string of content to match, a location where that string is to be searched for, and an associated action to take if all the conditions of the rule are met.

An example rule might match packets that look like a known buffer overflow exploit in a web server; the corresponding action might be to log the packet information and alert the administrator. Rules can come in many forms, but frequently the heart of the rule consists of strings to be matched anywhere in the payload of a packet. The problem is that for the detection to be accurate, it is necessary to search every byte of every packet for a potential match from a large set of strings. For example, the rule set from Snort has on the order of 1000 strings with an average length of around 12 bytes. In addition to raw processing speed, a string matching engine must have bounded performance in the worst case so that a performance based attack cannot be mounted against it [9]. Due to the fact that rule sets are constantly growing and changing as new threats emerge, a successful design must have the ability to be updated quickly and automatically all the while maintaining continuous operation.

Figure 8:
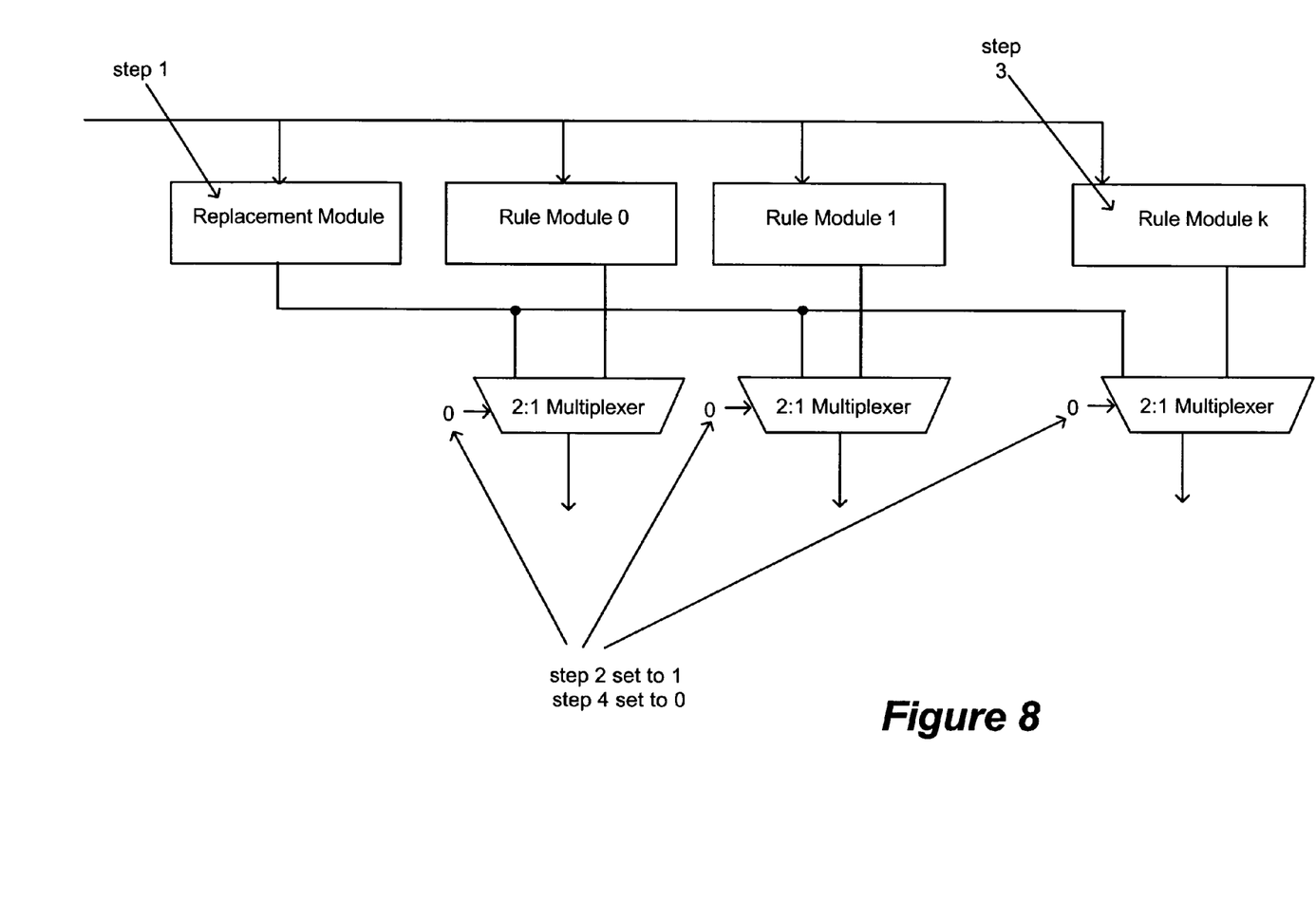
FIG. 8 is a schematic illustrating a method for allowing non-interrupting rule updating, showing an additional temporary rule module, which covers for a module taken off line so it can be updated.
Figure 9:
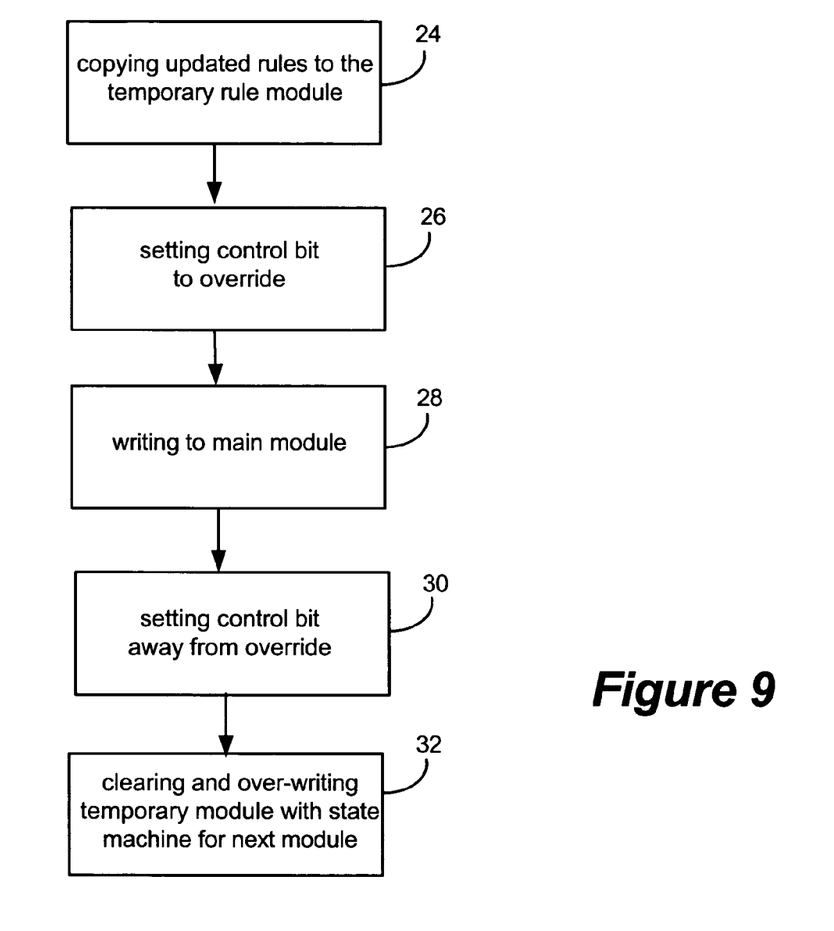
FIG. 9 is a flowchart illustrating a method for allowing non-interrupting rule updating, showing an additional temporary rule module, which covers for a module taken off line so it can be updated.

FIGS. 8 and 9 illustrate a method, for example, a replacement update model, allowing non-interrupting rule update. FIGS. 8 and 9 show the addition of an new rule module which acts as a temporary state machine. The rule set is already partitioned into several smaller parts that each fit onto a rule module. To replace the contents of one rule module, the rules are first updated and copied to the temporary rule module (block 24 in FIG. 9 and step 1 in FIG. 8). At the start of the next packet, the control bit for the module about to be overwritten is set to override with the results from the replacement rule module (block 26 in FIG. 9 and step 2 in FIG. 8). The main rule module can then be written (with the same contents as the replacement module) with no stop in service (block 28 in FIG. 9 and step 3 in FIG. 8). When the main rule module is completely updated, the control bit is switched back to zero to allow the main module to operate (block 30 in FIG. 9 and step 4 in FIG. 8) and the replacement module is wiped clean and overwritten with the state machine for the next module in line (block 32). Writing to an entire rule module will take on the order of 1.6 microseconds, and to finish an entire update would take less than 108 microseconds. While for the present invention's architecture the procedure for updating rules is very straightforward, this is by design and most other techniques require at least some amount of downtime to perform an update.

Possible Modifications and Extensions

While this description explores an application specific approach, it is certainly feasible that the techniques developed and presented here would allow for the efficient mapping of string matching to other tile based architectures. For example, Cho and Mangione-Smith presented a technique for implementing state machines on block-RAMs in FPGAs [6] and concurrent to the present invention. Aldwairi et. al. [2] proposed mapping state machines to on-chip SRAM. Another example where the optimizations presented here would still be valuable, is where the application is mapped down to more general purpose programmable memory tiles [14,19,18].

Furthermore, the methods described allow for a compact design that can be efficiently replicated if higher bandwidths are required. Replication, while useful, requires that there are multiple several distinct streams of data to be processed, for example, independent network packets. However, in some situations there may be only a single stream of data to search. In this case, one way that the present invention's method can be extended to provide adequate bandwidth is to process multiple bytes of the input stream at a time.

Processing multiple bytes of data at a time is analogous to a multi-bit trie, instead of using only a single byte of the input stream to determine the next state, two or more of the bytes of the input stream are used. Applying this idea to the original Aho-Corrasick state machines could be problematic as each state already has 256 next state pointers. To make the state machine read 2 bytes at a time, each state would have $256^2$ next state pointers, and doing n bytes at a time will require $256^n$ out edges per state. This explosion of transitions and states suggests that multi-byte transitions may not be feasible for the full Aho-Corrasick state machines.

Things become significantly easier with our bit-split algorithm, as it reduces the number of next state pointers to exactly 2 for each state. This property allows the present invention to read multiple bytes per cycle in practice. For example, to read 2 bytes per cycle, the present invention only needs to build binary state machines that each reads 2 bits per cycle (with 4 out edges). A multi-byte extension to the present invention's bit-split engine is therefore also possible, to approach higher bandwidths when replication cannot be employed.

Advantages and Improvements Over Existing Practice

The present invention offers the following advantages over conventional techniques:

Ten times greater efficiency in terms of speed per area.
Easier implementation in hardware and software.
Updating with new rules occurs without interrupting operations and within seconds, compared with hours for conventional methods.
Tight worst-case bounds on performance.

The present invention thus provides significant benefit for applications that rely on the ability to search data for matching rules, comprising:

Network intrusion detection systems.
IP (Internet Protocol) address lookup engines.
Packet classifiers.

The present invention is particularly suited for custom routers, chip-multiprocessors, and tile-based devices, as it allows large graph structures to be partitioned into a set of smaller graphs which require a much smaller amount of area in total and can operate more quickly.

Computer systems now operate in an environment of near ubiquitous connectivity, whether tethered to a Ethernet cable or connected via wireless technology. While the availability of "always on" communication has created countless new opportunities for web based businesses, information sharing, and coordination, it has also created new opportunities for those that seek to illegally disrupt, subvert, or attack these activities. With each passing day there is more critical data accessible over the network, and any publicly accessible system on the Internet is subjected to more than one break in attempt per day. Because we are all increasingly at risk there is widespread interest in combating these attacks at every level, from end hosts and network taps to edge and core routers. Intrusion detection and prevention has proven to be very effective at finding and blocking known attacks in the network, before they are even accessed by the end host, but there are significant computational challenges in making it scalable. Every byte of every packet needs to be scanned to see if the signatures of known attacks are present, and this requires very high throughput methods for string matching.

Network and security issues are of growing importance to consumers, and new architectural solutions in this space offer the potential of order-of-magnitude increases in performance and utility. The present invention is of significance to industry because it provides a solution to an important and difficult problem in the network processing domain, including the growing arena of hardware assisted network security.

REFERENCES

The following references are incorporated by reference herein:

1. A. V. Aho and M. J. Corasick. Efficient string matching: An aid to bibliographic search. Communications of the ACM, 18(6), pages 333-340, 1975.
2. Monther Aldwairi, Thomas Conte, and Paul Franzon. Configurable string matching hardware for speedup up intrusion detection. In Workshop on Architectural Support for Security and Anti-virus (WASSA), held in Cooperation with ASPLOS XI, October 2004.
3. Zachary K. Baker and Viktor K. Prasanna. A methodology for synthesis of efficient intrusion detection systems on FPGAs. In Proceedings of the Field-Programmable Custom Computing Machines, pages 135-144, 2004.
4. Zachary K. Baker and Viktor K. Prasanna. Time and area efficient pattern matching on FPGAs. In Proceeding of the 2004 ACM/SIGDA 12th International Symposium on Field Programmable Gate Arrays, pages 223-232, 2004.
5. R. S. Boyer and J. S. Moore. A fast string searching algorithm. Communications of the ACM, 20(10):761-772, 1977.
6. Y. Cho and W. Mangione-Smith. Deep packet filter with dedicated logic and read only memories. In IEEE Symposium on Field-Programmable Custom Computing Machines, April 2004.
7. Young H. Cho, Shiva Navab, and William H. Mangione-Smith. Specialized hardware for deep network packet filtering. In 12th International Conference on Field-Programmable Logic and Applications, 2002.
8. Christopher R. Clark and David E. Schimmel. Efficient reconfigurable logic circuits for matching complex network intrusion detection patterns. In Proceedings of the 13th International Conference on Field Programmable Logic and Applications, September 2003.
9. Scott A Crosby and Dan S Wallach. Denial of service via algorithmic complexity attacks. In Proceedings of USENIX Annual Technical Conference, June 2003.
10. Sarang Dharmapurikar, Michael Attig, and John Lockwood. Deep packet inspection using parallel bloom filters. Micro, IEEE, 24(1), pages 52-61, 2004.
11. Mike Fisk and George Varghese. Applying fast string matching to intrusion detection. Technical Report, in preparation, successor to UCSD TR CS2001-0670, University of California, San Diego.
12. Maya Gokhale, Dave Dubois, Andy Dubois, Mike Boorman, Steve Poole, and Vic Hogsett. Granidt: Towards gigabit rate network intrusion detection technology. In Proceedings of the 12th International Conference on Field-Programmable Logic and Applications, pages 404-413, 2002.
13. B. L. Hutchings, R. Franklin, and D. Carver. Assisting network intrusion detection with reconfigurable hardware. In Proceedings of the 10th Annual IEEE Symposium on Field-Programmable Custom Computing Machines, page 111, 2002.
14. K. Mai, T. Paaske, N. Jayasena, R. Ho, W. Dally, and M. Horowitz. Smart memories: A modular reconfigurable architecture. In Annual International Symposium on Computer Architecture, June 2000.
15. Martin Roesch. Snort—lightweight intrusion detection for networks. In Proceedings of LISA '99: 13th Systems Administration Conference, pages 229-238, November 1999.
16. Ioannis Sourdis and Dionisios Pnevmatikatos. Pre-decoded CAMs for efficient and high-speed NIDS pattern matching. In Proceedings of the Field-Programmable Custom Computing Machines, pages 258-267, 2004.

17. V. Srinivasan and G. Varghese. Fast address lookups using controlled prefix expansion. ACM Transactions on Computer Systems, 7(1), pages 1-40, February 1999.
18. Steve Swanson, Ken Michelson, Andrew Schwerin, and Mark Oskin. Wavescalar. In 36th International Symposium on Microarchitecture, December 2003.
19. Michael Bedford Taylor, Walter Lee, Jason Miller, David Wentzlaff, Ian Bratt, Ben Greenwald, Henry, Hoffmann, Paul Johnson, Jason Kim, James Psota, Arvind Saraf, Nathan Shnidman, Volker Strumpen, Matt Frank, Saman Amarasinghe, and Anant Agarwal. Evaluation of the Raw microprocessor: An exposed-wire-delay architecture for ILP and streams. In Annual International Symposium on Computer Architecture, June 2004.
20. Nathan Tuck, Timothy Sherwood, Brad Calder, and George Varghese. Deterministic memory-efficient string matching algorithms for intrusion detection. In the 23rd Conference of the IEEE Communications Society (Infocomm), March 2004.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for high throughput pattern matching, comprising:
   executing, in a circuit, processor or controller, an array of finite state machines to efficiently search an input stream comprised of one or more bytes of a set of data for any number of rules, wherein each of the finite state machines receives only a subset of bits comprising one, two or four bits of each byte of the set of data from the input stream, and searches the subset of bits from the input stream for a bit-split representation of the rules comprising a subset of the rules, a subset of bits in each rule, or a combination of the subset of the rules and the subset of the bits in each rule.

2. The method of claim 1, wherein the rules define search patterns.

3. The method of claim 2, wherein the search patterns are used to perform string matching.

4. The method of claim 1, further comprising building the finite state machines using bit-level partitioning of the rules prior to or during the executing step.

5. The method of claim 4, wherein the building step comprises translating a rule set into an array of bit-level finite state machines that serve a same purpose, thereby bit splitting a finite state machine representation.

6. The method of claim 5, wherein each of the bit level finite state machines matches only some of the bits of the input stream.

7. The method of claim 5, wherein the bit-level finite state machines are binary state machines.

8. The method of claim 7, wherein the executing and searching step further comprises:
   (1) distributing the one, two or four bits of each byte of the set of data to each of the binary state machines;
   (2) matching the one, two, or four bits to the subset of the rules, the subset of the bits in each rule, or a combination of such subsets, in each binary state machine;
   (3) outputting a partial match vector from each binary state machine; and
   (4) generating a full match vector using the partial match vector.

9. The method of claim 1, wherein a rule compiler partitions and bit-splits a finite state machine representation of the rules into a set of smaller implementable state transition tables.

10. The method of claim 9, wherein the rules are partitioned into groups of 8 or 16 strings, and the bit splitting is into four smaller implementable state transition tables.

11. The method of claim 1, wherein the finite state machines are Aho-Corasick state machines.

12. The method of claim 1, wherein the finite state machines operate in parallel.

13. The method of claim 1, wherein results of the finite state machines are combined together to produce a final result.

14. The method of claim 1, wherein a match is always indicated if it exists, and never indicated if it does not exist.

15. The method of claim 1, wherein a match is always indicated if it exists, and sometimes indicated if it does not exist, in the case of false positives.

16. The method of claim 1, further comprising executing an accelerator to perform a different search than the finite state machines.

17. The method of claim 1, wherein the pattern matching is applied to network processing data.

18. The method of claim 17, wherein the network processing comprises network intrusion detection, address lookup, or packet classification.

19. A device for high throughput pattern matching, comprising:
   a circuit, processor or controller executing an array of finite state machines to efficiently search an input stream comprised of one or more bytes of a set of data for any number of rules, wherein each of the finite state machines receives only a subset of bits comprising one, two or four bits of each byte of the set of data from the input stream, and searches the subset of bits from the input stream for a bit-split representation of the rules comprising a subset of the rules, a subset of bits in each rule, or a combination of the subset of the rules and the subset of the bits in each rule.

20. The device of claim 19, operating above or at 10 Gigabits per second using a Snort rule set stored in 0.4 MegaBytes or less of space.

21. The device of claim 19, with increased throughput and minimized storage requirements.

* * * * *

UNITED STATES PATENT AND TRADEMARK OFFICE
CERTIFICATE OF CORRECTION

| | | |
|---|---|---|
| PATENT NO. | : 8,010,481 B2 | Page 1 of 1 |
| APPLICATION NO. | : 11/715186 | |
| DATED | : August 30, 2011 | |
| INVENTOR(S) | : Sherwood et al. | |

It is certified that error appears in the above-identified patent and that said Letters Patent is hereby corrected as shown below:

On the Title Page, item (56), under "Other Publications", Line 1, delete "Troughput" and insert -- Throughput --.

On Title Page 2, item (56), under "Other Publications", Line 20, delete "Field-Progammable" and insert -- Field-Programmable --.

Signed and Sealed this
Twenty-eighth Day of February, 2012

David J. Kappos
*Director of the United States Patent and Trademark Office*